(12) United States Patent
Lu et al.

(10) Patent No.: US 8,164,885 B2
(45) Date of Patent: Apr. 24, 2012

(54) ELECTRONIC DEVICE WITH DETACHABLE COVER

(75) Inventors: Wen-Hsiang Lu, Taipei Hsien (TW); Huai-Shan Gu, Shenzhen (TW); Li-Tao Zhang, Shenzhen (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 221 days.

(21) Appl. No.: 12/758,802

(22) Filed: Apr. 13, 2010

(65) Prior Publication Data

US 2011/0128677 A1    Jun. 2, 2011

(30) Foreign Application Priority Data

Nov. 30, 2009    (CN) .......................... 2009 1 0310682

(51) Int. Cl.
*H05K 7/00*    (2006.01)
(52) U.S. Cl. ..................... 361/679.01; 429/97; 429/100; 455/90.3; 455/575.8

(58) Field of Classification Search ............. 361/679.01; 429/90.3, 550.1, 575.8; 455/90.3, 550.1, 455/575.8
See application file for complete search history.

(56) References Cited

U.S. PATENT DOCUMENTS

| 7,303,424 B2 * | 12/2007 | Tu et al. ......................... 439/372 |
| 2006/0141344 A1 * | 6/2006 | Chen et al. ....................... 429/97 |
| 2010/0119925 A1 * | 5/2010 | Chen ............................ 429/100 |

* cited by examiner

*Primary Examiner* — Robert J Hoffberg
(74) *Attorney, Agent, or Firm* — Altis Law Group, Inc.

(57) ABSTRACT

An electronic device with a detachable cover comprises a main body, a cover connected to the main body, and a spring. The main body forms an opening, wherein a flange extends inwardly from an upper edge of the opening, and a first locking portion protrudes from an edge of the main body. And the cover comprises a base plate, a sliding member, and a rotating member. The base plate is received in the opening and is supported by the flange comprising an protruding tab engaging the edge of the main body and a first recess. The sliding member is slidably connected to the base plate, and comprises a second locking portion with a second recess and a first engagement member. The rotating member rotatably connected to the base plate, and comprises a second engagement member. The spring comprises a base portion and two deflected spring arms.

11 Claims, 4 Drawing Sheets

ELECTRONIC DEVICE WITH DETACHABLE COVER

BACKGROUND

1. Technical Field

The present disclosure relates to electronic devices, more particularly, to an electronic device with a detachable cover.

2. Description of the Related Art

Generally, portable electronic devices, such as mobile phones, include a removable back cover for removal of a battery or a memory card. However, often the covers fit with the device bodies so tightly that they are very difficult to be detached when needed. Parts of the cover or device may be damaged in the struggle to detach the cover. Therefore, a new type of cover assembly is needed to overcome the above-mentioned shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the electronic device. Moreover, in the drawings, like reference numerals designate corresponding parts throughout the several views.

DETAILED DESCRIPTION

Figure 1:
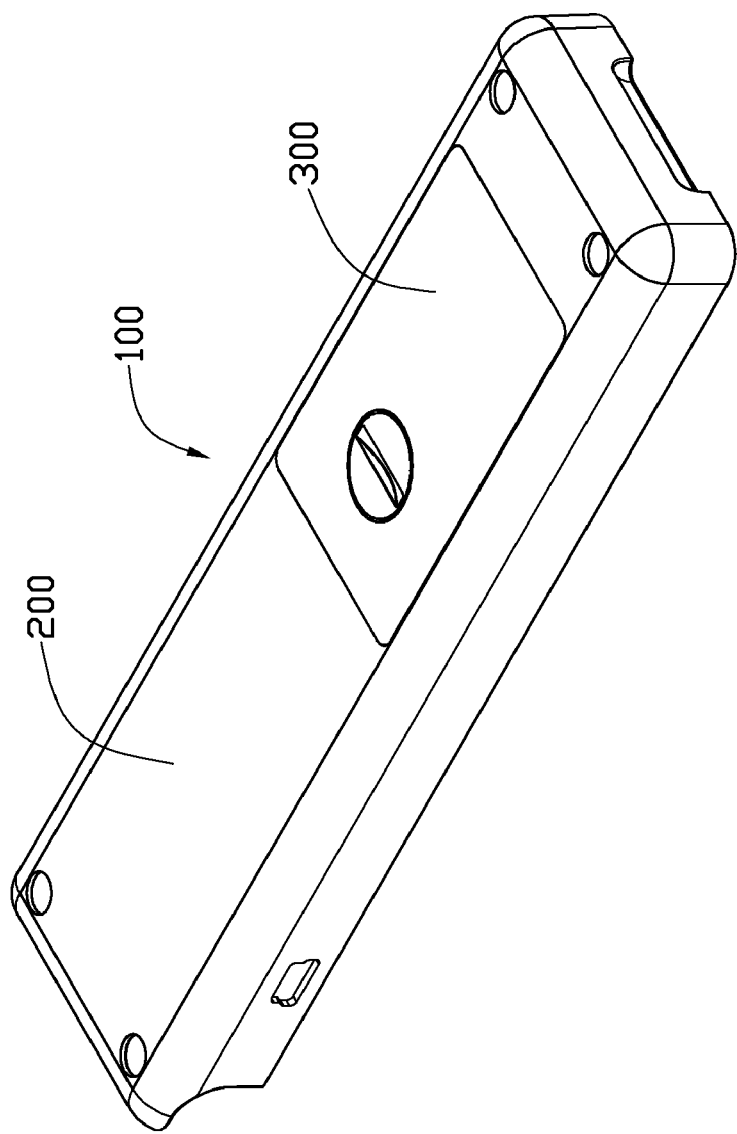
FIG. 1 is an isometric view of an electronic device with a detachable cover in accordance with an exemplary embodiment.
Figure 2:
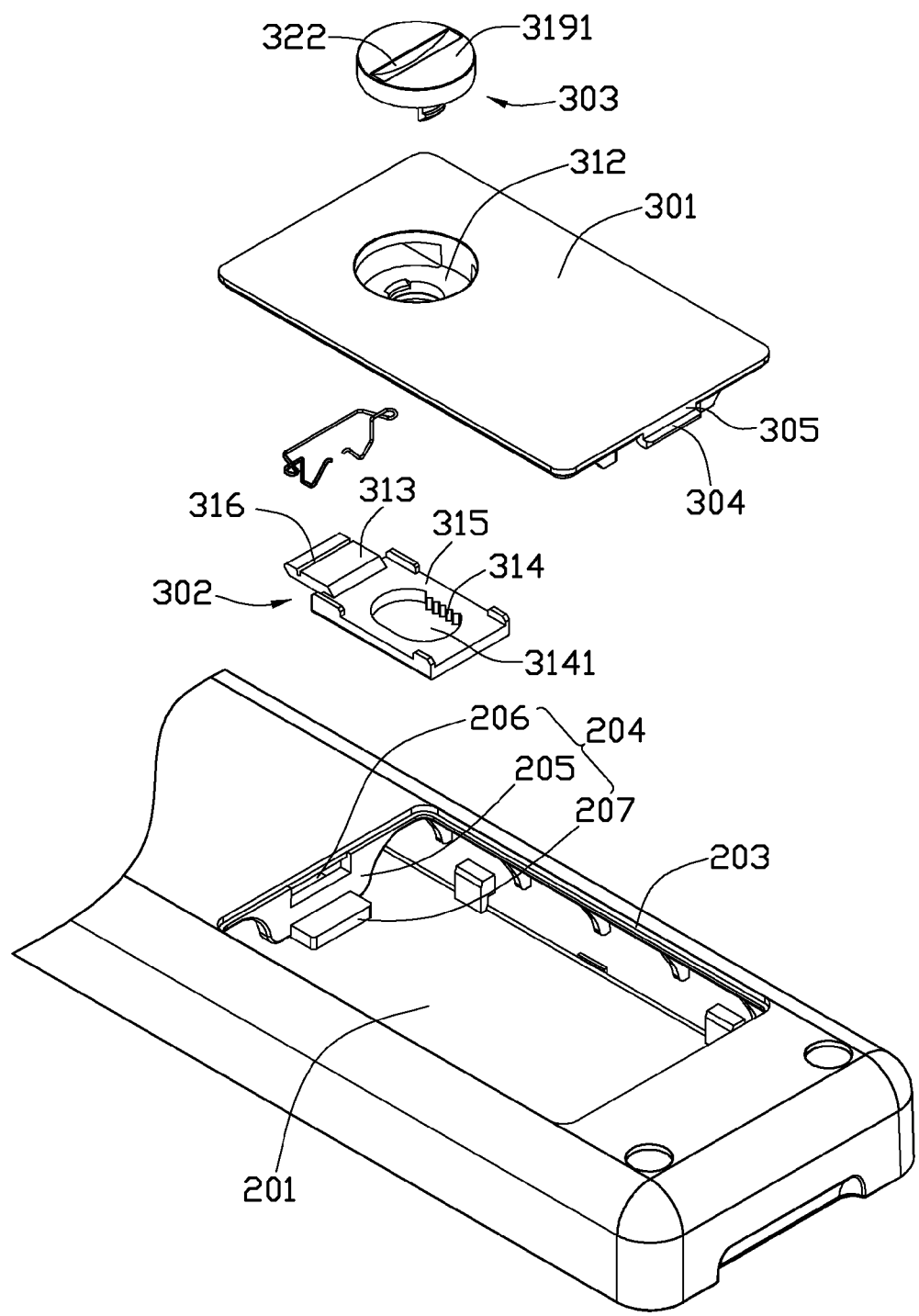
FIG. 2 is a partial, exploded view of the electronic device of FIG. 1.
Figure 3:
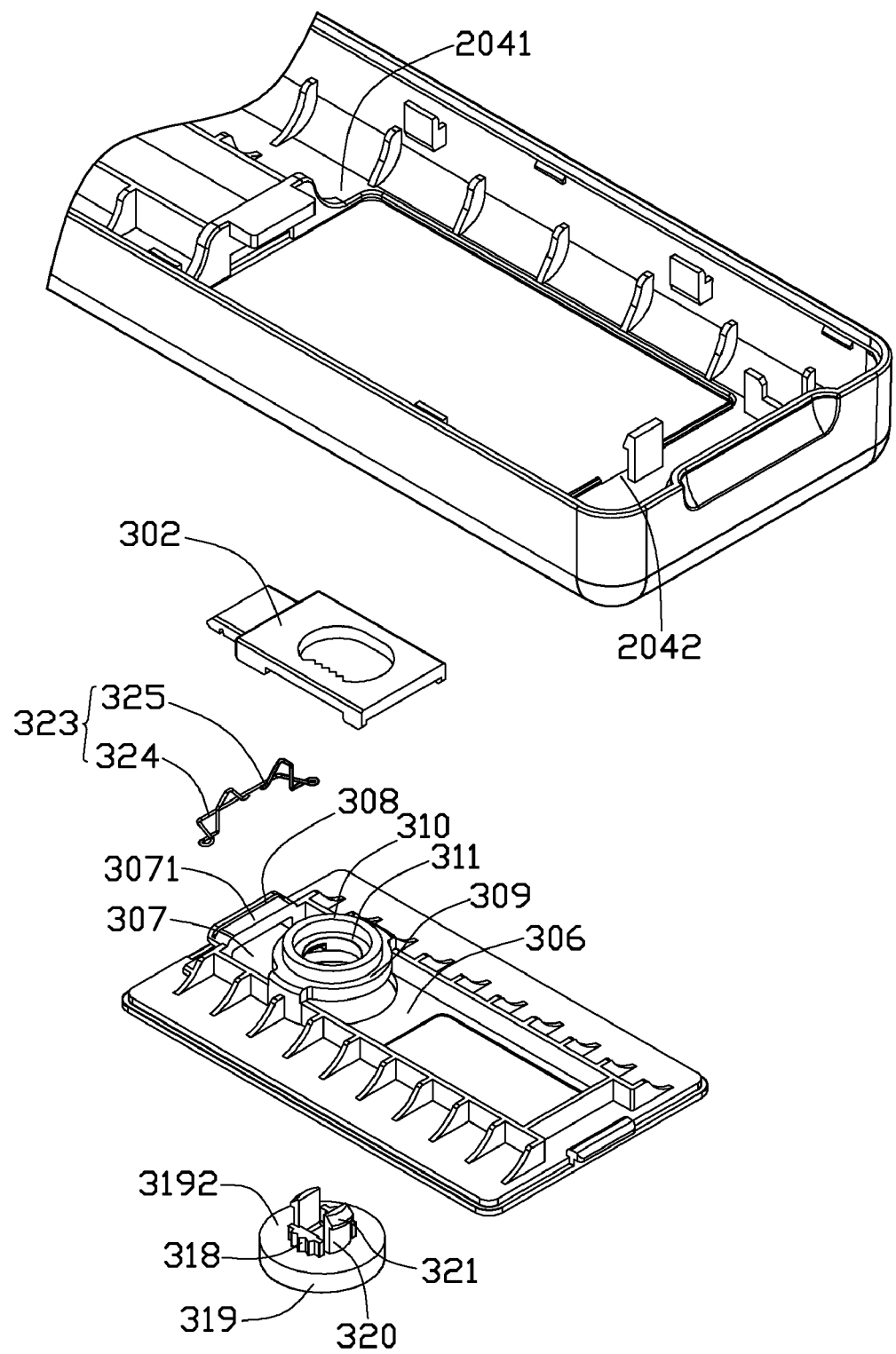
FIG. 3 is similar to FIG. 2 but viewed from another perspective.

Referring to FIGS. 1-3, an electronic device 100 includes a main body 200 and a cover 300 connected to the main body 200. The main body 200 defines an opening 201 for receiving the cover 300. A flange 203 extends inwardly from an upper edge of the opening 201.

A first locking member 204 is mounted on an edge 2041 of the main body 200, extending in the opening 201. In the exemplary embodiment, the first locking member 204 includes a sidewall 205, a first through hole 206 and a locating member 207. The sidewall 205 extends vertically from the edge 2041 of the main body 200. The first through hole 206 is formed in the sidewall 205, adjacent to the edge 2041. The locating member 207 protrudes from the sidewall 205 into the opening 201.

The cover 300 includes a base plate 301, a sliding member 302, and a rotating member 303. The base plate 301 is shaped to fit the opening 201 of the main body 200, such that the base plate 301 can be properly retained within the opening 201 and supported by the flange 203. The base plate 301 includes a protruding tab 304 formed at one end 305. When the cover 300 is assembled on the main body 200, the protruding tab 304 engages the edge 2042 of the main body 200. The protruding tab 304 cooperates with a second locking member 313 to attach the cover 300 to the main body 200, which will be described in detail later.

Figure 4:
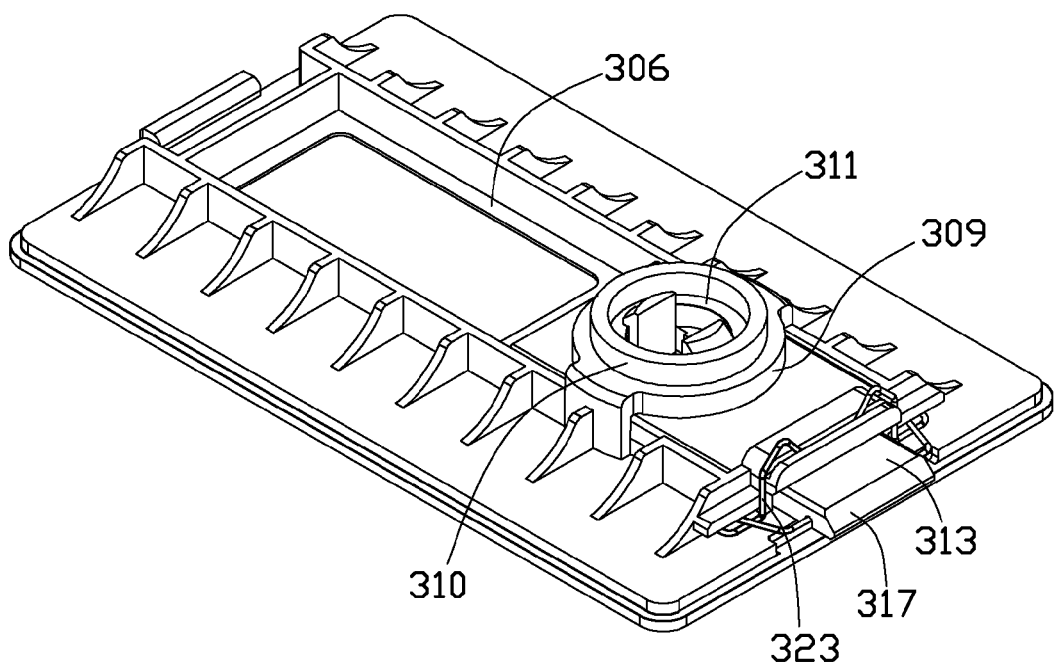
FIG. 4 is an assembled, isometric view of a cover of the electronic device of FIG. 2.

Referring to FIG. 4, in the exemplary embodiment, a receiving space 306 is defined in an inner surface of the base plate 301. The receiving space 306 is a rectangular groove. An opening 307 is formed in a wall 3071 at an end of the base plate 301 communicating with the receiving space 306. A first recess 308 is formed in a surface of the wall 3071 and extends along an edge of the end of the base plate 301. The base plate 301 also includes a retainer 309 formed above the bottom of the receiving space 306. The retainer 309 defines a stepped hole 310 that includes a stepped surface 311. A connecting hole 312 is formed in a surface of the base plate 301 opposite to and communicating with the stepped hole 310 receiving the rotating member 303. The hole 312 is below the retainer 309.

The sliding member 302 is substantially rectangular and received in the receiving space 306 and includes the second locking member 313 and a first engagement member 314. In the exemplary embodiment, the sliding member 302 also includes a base member 315. A second recess 316 is formed in an end of the second locking member 313 and extends along a widthwise direction of the sliding member 302. The first engagement member 314 is a set of gear teeth formed in a side of an opening 3141 defined in the base member 315. The end of the second locking member 313 with the recess 306 defines a sloped surface 317 that facilitates the insertion of the second locking member 313 into the first through hole 206.

The rotating member 303 includes a second engagement member 318. The second engagement member 318 cooperates with the first engagement member 314 to convert the rotation of the rotating member 303 to a sliding movement of the sliding member 302.

In the exemplary embodiment, the rotating member 303 is a circular plate and includes a base 319. The base 319 includes a first surface 3191 and a second surface 3192. The first surface 3191 of base 319 defines a slot 322. The slot 322 is used to fit a tool such as a screwdriver to rotate the rotating member 303. The rotating member 303 also includes two elastic tabs 320 protruding from the second surface 3192. The second engagement member 318 protrudes from the second surface 3192 and defines a set of gear teeth.

The two spring tabs 320 are spaced from each other. Each spring tab 320 includes a hook 321 formed at a distal end thereof. The elastic tabs 320 extend through the hole 312 and snap into the stepped hole 310 of the retainer 309. That is, the hooks 321 engage the stepped surface 311 of the stepped hole 310. The base 319 engages an outer surface of the base plate 301. The rotating member 303 is snap-connected to the base plate 301. The stepped hole 310 is designed to have a proper size to allow the rotation of the rotating member 303. After the rotating member 303 is connected to the base plate 301, the first engaging member 314 is engaged with the second engagement member 318.

In the exemplary embodiment, the cover 300 also includes a spring 323. The spring 323 includes a base portion 324 and two deflected spring arms 325. The base portion 324 is retained within the second recess 316 of the second locking member 313. Ends of the spring arms 325 are retained within the first recess 308. The second locking member 313 is kept to protrude out of the opening 307 of the base plate 301 by the spring force of the spring 323.

To connect the cover 300 to the main body 200, the cover 300 is orientated with the protruding tab 304 engaging with the inner surface of the main body 200. The other end of the base plate 301 is pressed to move towards the opening 201. Because the second locking member 313 protrudes out of the opening 307 of the base plate 301, the second locking member 313 will contact the edge of the opening 201, which prevents the base plate 301 from being further received in the opening 201. The rotation member 303 is then rotated to cause the second engagement member 318 to engage with the first engagement member 314. The sliding member 302 is caused to slide inward into the opening 307. The base plate 301 is received in the opening 201 and supported by the flange 203.

After that, the rotating member 303 is rotated back to cause the sliding member 302 to slide back, causing the end of the second locking member 313 to move into the through hole 206. The first locking member 304 and the second locking member 313 cooperate to prevent the base plate 301 from disengaging from the main body 200.

To detach the cover 300 from the main body 200, the rotating member 303 is rotated to cause the sliding member 302 to slide inwardly into the opening 307. The restraint to the cover 300 is removed, which allows the cover 300 to be detached from the main body 200.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. An electronic device with a detachable cover, comprising:
   a main body forming a body opening, a flange extending inwardly on a side surface of the body opening adjacent to an upper edge of the body opening, and a first locking member protruding from a first edge of the body opening of the main body;
   the detachable cover comprising:
      a base plate received in the body opening and supported by the flange of the main body, the base plate comprising a first recess adjacent the first edge of the body opening of the main body, and a protruding tab engaging a second edge of the body opening of the main body, the second edge on an opposite side of the body opening to the first edge;
      a sliding member slidably connected to the base plate, and comprising a second locking member with a second recess, and a first engagement member; and
      a rotating member rotatably connected to the base plate, and comprising a second engagement member cooperating with the first engagement member; and
   a spring comprising:
      a base portion retained within the second recess of the second locking member; and
      two deflected spring arms retained within the first recess of the base plate,
   wherein, the second locking member is thus kept to protrude out of an end of the base plate; wherein, when the rotating member moves from a first position to a second position, the second locking member cooperates with the first locking member to removably connect the detachable cover to the main body by a spring force of the spring.

2. The electronic device as described in claim 1, wherein the first locking member includes a sidewall, a first through hole and a locating member, the sidewall extends vertically from an inner surface of the main body, the first through hole is formed in the sidewall, the locating member protrudes from the sidewall.

3. The electronic device as described in claim 1, wherein the base plate is shaped to fit the body opening of the main body, such that the base plate can be properly retained within the body opening and supported by the flange.

4. The electronic device as described in claim 1, wherein a receiving space is defined in an inner surface of the base plate for receiving the sliding member, a through body opening is formed in a wall formed at the end of the base plate and communicates with the receiving space.

5. The electronic device as described in claim 4, wherein the first recess is formed in an upper surface of the wall and extends along the lengthwise direction of the wall.

6. The electronic device as described in claim 1, wherein the base plate also includes a retainer formed above a bottom of the receiving space, the retainer defines a stepped hole that includes a stepped surface.

7. The electronic device as described in claim 6, wherein the rotation member further comprises a base section, two elastic tabs, the base section comprises a first surface and a second surface, the first surface of the base section defines a slot, the slot is used to fit a tool to rotate the rotation member, the two elastic tabs and the second engagement member protrude from the second surface, the two elastic tabs are spaced from each other, the second engagement member defines a set of gear teeth.

8. The electronic device as described in claim 7, wherein each elastic tab of the two elastic tabs comprises a hook formed at an end thereof, the two elastic tabs extend through the connecting hole and snaps into the stepped hole of the retainer, that is, the hooks engage the stepped surface of the stepped hole, the base section engages an outer surface of the base plate, the rotation member is thus snap-connected to the base plate, the stepped hole is sized to allow a rotation of the rotation member, the rotation member is connected to the base plate, after the rotation of the rotation member to the second position, the first engagement member is caused to engage the second engagement member.

9. The electronic device as described in claim 1, wherein a connecting hole is formed in the detachable cover for receiving the rotation member, the connecting hole extends through the detachable cover and communicates with the receiving space, when the detachable cover is received in the body opening under the flange of the main body, the connecting hole is below the retainer.

10. The electronic device as described in claim 1, wherein the sliding member also includes a base member, the second recess is formed in the second locking member and extends along a widthwise direction of the sliding member.

11. The electronic device as described in claim 10, wherein the first engagement member is a set of gear teeth formed in a side of a base opening defined in the base member, an end of the second locking member defines a sloped surface that facilitates the insertion of the second locking member into a first through hole defined in the first locking member.

* * * * *